United States Patent
Kindo (10) Patent No.: US 11,202,041 B2
(45) Date of Patent: Dec. 14, 2021

(54) EVENT CAMERA

(71) Applicant: Toyota Jidosha Kabushiki Kaisha, Toyota (JP)

(72) Inventor: Toshiki Kindo, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/834,127

(22) Filed: Mar. 30, 2020

(65) Prior Publication Data

US 2020/0344451 A1 Oct. 29, 2020

(30) Foreign Application Priority Data

Apr. 25, 2019 (JP) .............................. JP2019-084397

(51) Int. Cl.
 *H04N 7/18* (2006.01)
 *G06K 9/20* (2006.01)

(52) U.S. Cl.
 CPC ........... *H04N 7/188* (2013.01); *G06K 9/2027* (2013.01)

(58) Field of Classification Search
 None
 See application file for complete search history.

(56) References Cited

U.S. PATENT DOCUMENTS

| | | | | |
|---|---|---|---|---|
| 9,128,354 B2 * | 9/2015 | Frashure | ................ | G03B 17/17 |
| 10,097,779 B2 * | 10/2018 | Park | .................... | G06F 11/3058 |
| 10,739,367 B2 * | 8/2020 | Takahashi | .............. | H04N 5/772 |
| 2010/0182468 A1 * | 7/2010 | Posch | .................... | H04N 5/335 |
| | | | | 348/294 |
| 2013/0307988 A1 * | 11/2013 | Hansen | .............. | G06K 7/10425 |
| | | | | 348/157 |
| 2019/0197715 A1 * | 6/2019 | Rebecq | ................... | G06T 15/06 |
| 2020/0249017 A1 * | 8/2020 | Torok | ................... | G06K 9/2036 |

FOREIGN PATENT DOCUMENTS

| | | |
|---|---|---|
| EP | 3163432 A1 | 5/2017 |
| JP | 2010-510732 A | 4/2010 |
| WO | 2019067054 A1 | 4/2019 |

OTHER PUBLICATIONS

Gallego, Guillermo et al., "Event-based vision: A survey", ARXIV. org, Cornell University Library, 201 Olin Library Cornell University, Apr. 17, 2019, p. 1-25.

* cited by examiner

*Primary Examiner* — Joon Kwon
(74) *Attorney, Agent, or Firm* — Dinsmore & Shohl LLP (57) ABSTRACT

An event camera includes an event-based sensor configured to detect a change in light intensity for each pixel as an event, and asynchronously output an event signal including a time when the event is detected and a pixel position where the event has occurred, a buffer configured to store the event signal output by the event-based sensor within a predetermined period between a time traced back to the past by the amount of the predetermined time from a reference time, and the reference time, a storage configured to store an image, and an update unit configured to update the image stored in the storage based on the event signal such that the image stored in the storage becomes an image of an update time included in the predetermined period.

3 Claims, 9 Drawing Sheets

EVENT CAMERA

CROSS-REFERENCE TO RELATED APPLICATION

This application claims priority to Japanese Patent Application No. 2019-084397 filed on Apr. 25, 2019, which is incorporated herein by reference in its entirety.

BACKGROUND

1. Technical Field

The present disclosure relates to an event camera.

2. Description of Related Art

Japanese Unexamined Patent Application Publication No. 2010-510732 (JP 2010-510732 A) discloses a device that generates an image in electronic form. The device includes an image sensor, a digital processing unit, and a storage. The image sensor has a plurality of image elements arranged in a matrix. Each of the plurality of image elements corresponds to a pixel. The image elements include an exposure measurement circuit and a light intensity change detection circuit. The light intensity change detection circuit detects a change in light intensity in the field of view of the observed sensor based on the measurement result of the exposure measurement circuit.

The image element asynchronously transmits the change in light intensity and its address to the digital processing unit by event control. The digital processing unit converts the change in light intensity to a digital value and stores it in the storage. The storage contains one memory cell for each pixel. The storage stores a grayscale image generated by the image sensor and the digital processing unit. The grayscale image stored in the storage is asynchronously matched on a pixel-by-pixel basis when there is a change in light intensity. In other words, a grayscale image of the entire observed scene is stored in digital form in the storage, and a new grayscale image in which only pixels that detect a change in light intensity in the field of view of the sensor is updated is generated every time a light intensity changes.

SUMMARY

Since a camera having a so-called event-based sensor, such as the device described in JP 2010-510732 A, updates an image using a change in light intensity, an image generating principle in the camera having the event-based sensor is greatly different from a camera having a conventional image sensor. By focusing on this difference in the image generation principle and making improvements, an event camera equipped with the event-based sensor can exhibit functions that cannot be realized with the camera equipped with the conventional image sensor.

The present disclosure provides a new function of an event camera.

One aspect of the present disclosure is an event camera. The event camera includes an event-based sensor, a buffer, a storage, and an update unit. The event-based sensor is configured to detect a change in light intensity for each pixel as an event, and asynchronously output an event signal including a time when the event is detected and a pixel position where the event has occurred. The buffer is configured to store event signals output by the event-based sensor within a predetermined period between a time, traced back to the past by the amount of the predetermined time from a reference time, and the reference time. The storage is configured to store an image. The update unit is configured to update the image stored in the storage based on the event signal such that the image stored in the storage becomes an image of an update time included in the predetermined period.

In the event camera according to the above aspect of the present disclosure, the buffer and the storage store the event signal within the predetermined period and an image of a time included in the predetermined period, respectively. As such, the event camera can generate an image of any time within the predetermined period by, for example, outputting an image of the update time and the event signal within the predetermined period. Therefore, the event camera can provide a new function.

In the above aspect, the event camera may include a receiver configured to receive a designated time included in the predetermined period, and a generator configured to generate the image of the designated time based on the image stored in the storage, the event signal stored in the buffer, the update time, and the designated time received by the receiver. In this case, the event camera may generate the image of the designated time within the predetermined period.

In the above aspect, the update time may be a time traced back to the past by the amount of the predetermined time from the reference time. In this case, the predetermined period is a period between the update time and the reference time, and the update time is the earliest time within the predetermined period. As such, an image of any time within the predetermined period is generated by simply adding a change in light intensity according to the event signal to the image of the update time.

In the above aspect, the update time may be the reference time. In this case, the update time is a time closest to the current time (including the current time) within the predetermined period. As such, an image of any time within the predetermined period is generated by simply subtracting a change in light intensity according to the event signal from the image of the update time.

In the above aspect, the receiver may be configured to receive, from another sensor that outputs detection results at a predetermined measurement time, the measurement time as the designated time. In this case, the event camera can generate an image of the same time as the time when measurement results of another sensor are output.

With the foregoing aspect of the present disclosure, a new function of an event camera is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinbelow, various exemplified embodiments will be described. In the description below, the same or equivalent elements will be denoted by the same reference signs, and overlapping description will not be repeated.

First Embodiment

Configuration of Event Camera

Figure 1:
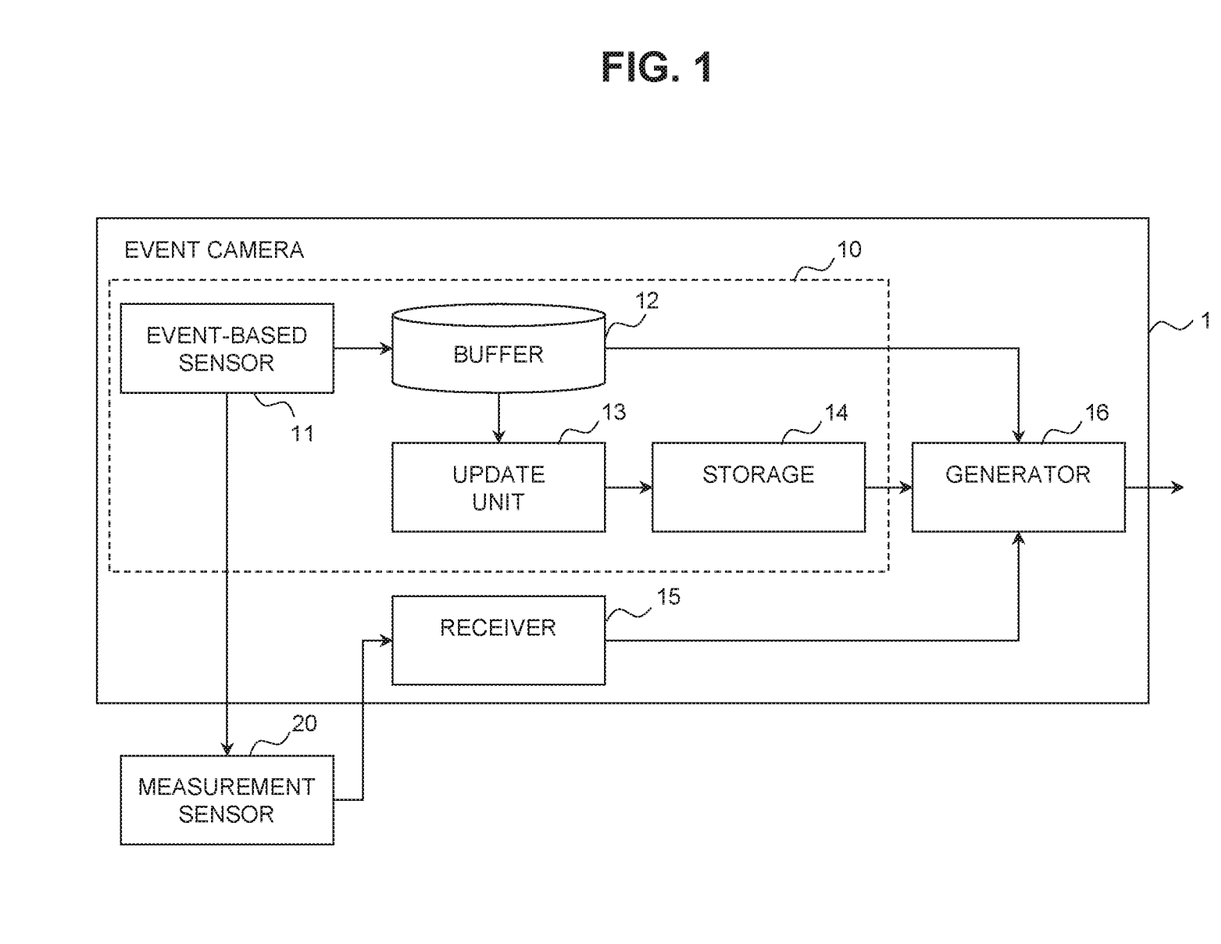
FIG. 1 is a block diagram describing an overview of a configuration of an event camera according to a first embodiment.

FIG. 1 is a block diagram describing an overview of a configuration of an event camera according to a first embodiment. Schematically, an event camera 1 illustrated in FIG. 1 detects a change in light intensity within an image capturing range and generates an image by updating only a pixel having a change in light intensity among the stored images. As illustrated in FIG. 1, the event camera 1 includes a sensor unit 10. The sensor unit 10 is a main component of the event camera 1, and includes an event-based sensor 11, a buffer 12, an update unit 13, and a storage 14.

The event-based sensor 11 detects a change in light intensity within the image capturing range and asynchronously outputs an event signal. The event-based sensor 11 may be composed of, for example, a plurality of image elements arranged in a matrix. An event signal is a signal associated with an event. The event is a change in light intensity of a pixel. The event signal includes, for example, a time when the event is detected and a pixel position where the event has occurred. The time when the event is detected may be measured based on an internal clock (an event camera time) of the event-based sensor. A reference of time at which the event has been detected may be reset as needed. The event signal may include a change value in light intensity. For example, the change value in light intensity may be the amount of change itself, or information indicating whether the change in light intensity is positive or negative. The event-based sensor 11 outputs the event signal only when a change in light intensity occurs. The "asynchronous output" means an output independent in time on a pixel-by-pixel basis without synchronization in all pixels.

The buffer 12 stores the event signal output by the event-based sensor. The buffer 12 may be composed of, for example, a recording medium including a logic circuit. The event signal stored in the buffer 12 is the event signal output by the event-based sensor within a predetermined period between a time, traced back to the past by the amount of the predetermined time from the reference time, and the reference time. The reference time is predefined, and may be, for example, the current time. The reference time may be a time before or after the current time. The predetermined time is set in advance according to the storage capacity of the buffer 12. For example, the buffer 12 stores event signals within a predetermined period according to a first-in last-out method. As such, the buffer 12 can store the event signals within the predetermined period while updating them.

The update unit 13 updates the image stored in the storage 14 based on the event signal. For example, the update unit 13 may be a logic circuit designed to update an image stored in the storage 14 based on the event signal. The storage 14 is a recording medium that stores images. For example, the storage 14 includes one memory cell for each pixel. The storage 14 is not limited to the form which has a memory cell for each pixel, and may be a recording medium that logically stores information for each pixel.

The update unit 13 updates the image stored in the storage 14 such that the image stored in the storage 14 becomes an image of the update time included in the predetermined period. The update unit 13 updates the image stored in the storage 14 based on the event signal stored in the buffer 12. As such, the image stored in the storage 14 becomes an image of the time traced back to the past by the amount of the predetermined time from the reference time. In other words, in the event camera 1, the update time is the time traced back to the past by the amount of the predetermined time from the reference time. Details of each time described with respect to the buffer 12 and the update unit 13 will be described below.

The event camera 1 can include, via the sensor unit 10, as one set, an image of the time traced back to the past by the amount of the predetermined time from the reference time, and the event signal output by the event-based sensor within the predetermined period between the time, traced back to the past by the amount of the predetermined time from the reference time, and the reference time. Therefore, for example, in response to a request from an image generation device outside the camera, the event camera 1 can provide an image and the event signal corresponding to the image to the image generation device. As such, the event camera 1 can cause the image generation device, and the like, outside the camera to generate an image of any time within the predetermined period.

The event camera 1 may also be configured to generate an image of any time within the predetermined period. In the example of FIG. 1, the event camera 1 includes a receiver 15 and a generator 16. Each of the receiver 15 and the generator 16 is composed of, for example, a logic circuit.

The receiver 15 receives the designated time included in the predetermined period. The predetermined period is a period in which the buffer 12 stores the event signal. The designated time is set in advance and is a time corresponding to the image generated by the generator 16. The receiver 15 receives a designated time from, for example, a measurement sensor 20 (an example of another sensor). The measurement sensor 20 outputs a detection result at a predetermined measurement time. Examples of the measurement sensor 20 are not particularly limited as long as the detecting azimuth of a sensor is within the field of view of the event camera 1, and may include a millimeter-wave radar, a Terahertz radar, a camera having a different feature (an infrared camera, a stereo camera, a camera having a different angle of view from the event camera 1, and the like), and a microphone array. The receiver 15 may receive the measurement time of the measurement sensor 20 as a designated time. In this case, the measurement sensor 20 expresses the measurement time using the event camera time input from the event-based sensor 11. The receiver 15 may receive the designated time from the image generation device outside the camera, or receive the designated time by an operation of a user.

The generator 16 generates an image of a designated time. The generator 16 generates the image of the designated time based on the image stored in the storage 14, the event signal stored in the buffer 12, the update time, and the designated time received by the receiver 15. The generated image can be output to the outside of the event camera 1. Details of the image generation will be described below.

Time Chart of Each Time

Figure 2:
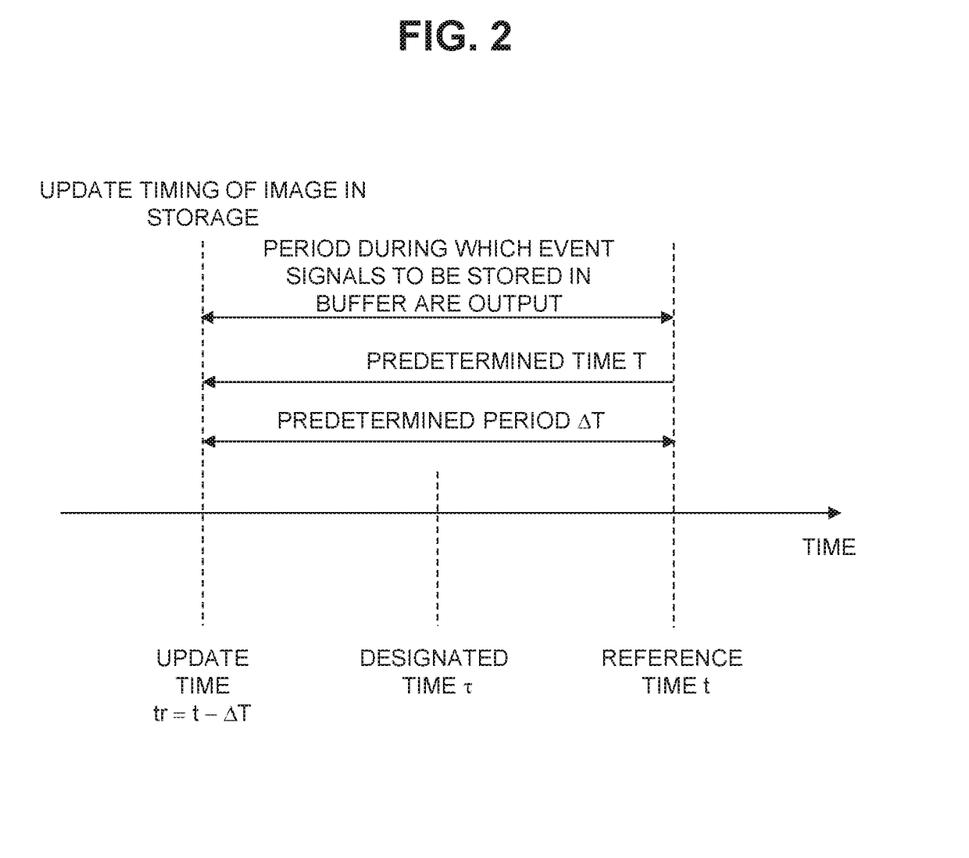
FIG. 2 is a time chart of a storage and a buffer.

FIG. 2 is a time chart of the storage and the buffer. As illustrated in FIG. 2, the time chart is based on a reference time t. A time t−ΔT, traced back by an amount of a predetermined time T from the reference time τ, is update timing (an update time tr) of the image stored in the storage 14. As such, the storage 14 stores an image of the time t−ΔT traced back from the reference time τ by the amount of the predetermined period ΔT. When the reference time τ is the current time, the storage 14 always stores an image of the time t−ΔT traced back from the current time τ by the amount of the predetermined period ΔT. The predetermined period ΔT starts at the update time tr (=t−ΔT) and ends at the reference time t. In other words, the predetermined period ΔT includes the update time tr and the reference time t. The buffer 12 stores event signals within the predetermined period ΔT. The designated time τ is included in the period (the predetermined period ΔT) between the update time tr and the reference time t.

Details of Image Generation by Generator

Figure 3:
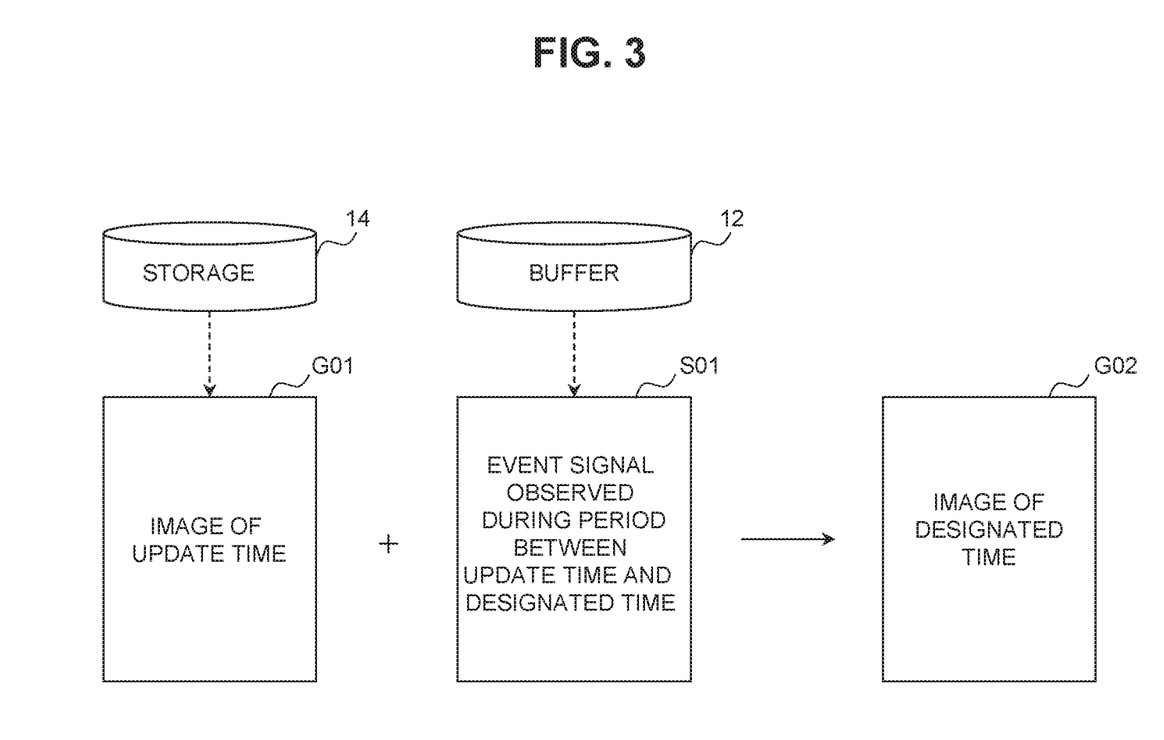
FIG. 3 is a diagram describing generation of an image of a designated time.

FIG. 3 is a diagram describing the generation of the image of a designated time. As illustrated in FIG. 3, an image G02 of the designated time τ is obtained by adding, to an image G01 of the update time tr, a change in light intensity according to an event signal S01 observed during a period between the update time tr and the designated time τ. The image G01 is stored in the storage 14. The event signal S01 is stored in the buffer 12. Since the designated time τ is any time included in the predetermined period ΔT, the generator 16 can generate any image within the predetermined period ΔT.

Operation of Event Camera

Figure 4:
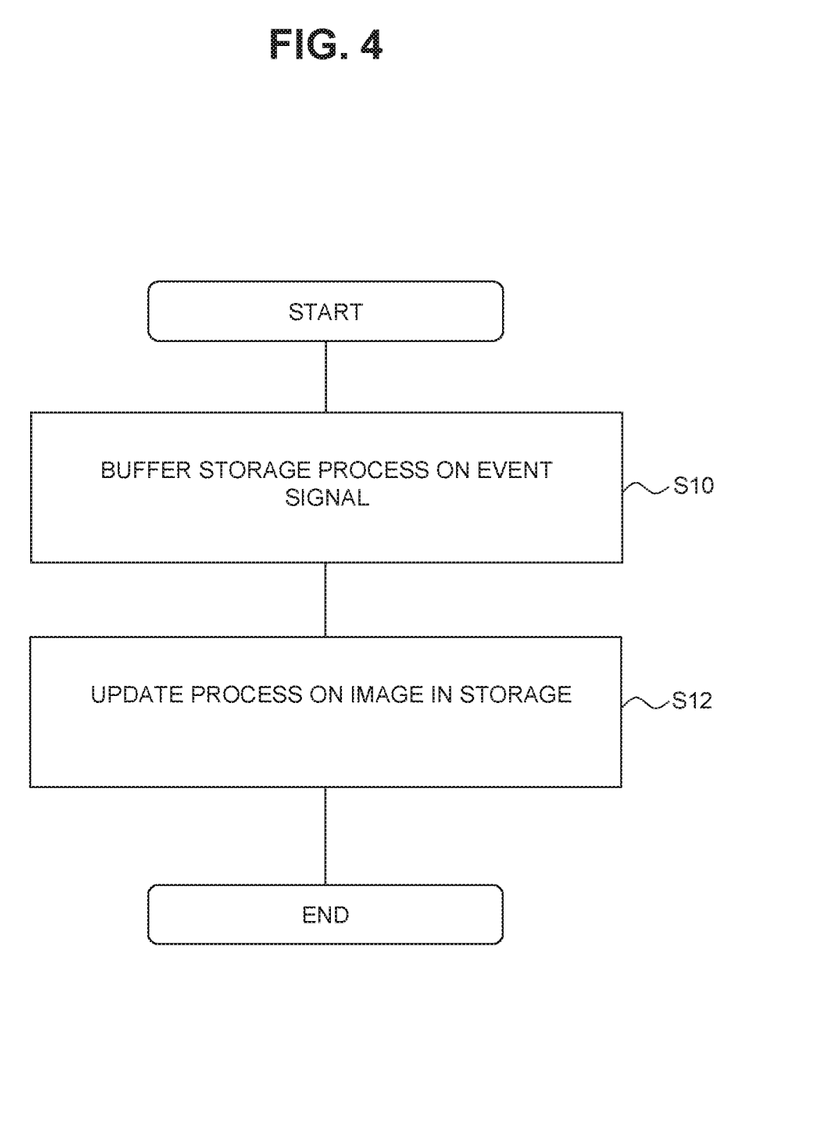
FIG. 4 is a flowchart illustrating an operation of a sensor unit of the event camera.

FIG. 4 is a flowchart illustrating an operation of the sensor unit of the event camera. The flowchart illustrated in FIG. 4 is performed when the event-based sensor 11 of the event camera 1 detects a change in light intensity in the image capturing field of view.

The event-based sensor 11 of the event camera 1 outputs the event signal to the buffer 12 when a change in light intensity occurs in the image capturing field of view. As a buffer storage process (S10), the buffer 12 stores the event signal within the predetermined period ΔT between the time t−ΔT, traced back to the past by the amount of the predetermined time T from the reference time t, and the reference time t, from among the event signals output by the event-based sensor 11.

Subsequently, as an update process (S12), the update unit 13 of the event camera 1 updates the image stored in the storage 14 using the event signal stored in the buffer 12. As such, the image stored in the storage 14 becomes the image of the update time tr traced back to the past by the amount of the predetermined time T from the reference time τ.

When the update process ends, the flowchart illustrated in FIG. 4 ends.

By performing the flowchart illustrated in FIG. 4, the event camera 1 can include, as one set, the image G01 of the time traced back to the past by the amount of the predetermined time T from the reference time t, and the event signal output by the event-based sensor 11 within the predetermined period ΔT between the time t−ΔT, traced back to the past by the amount of the predetermined time T from the reference time t, and the reference time t.

Figure 5:
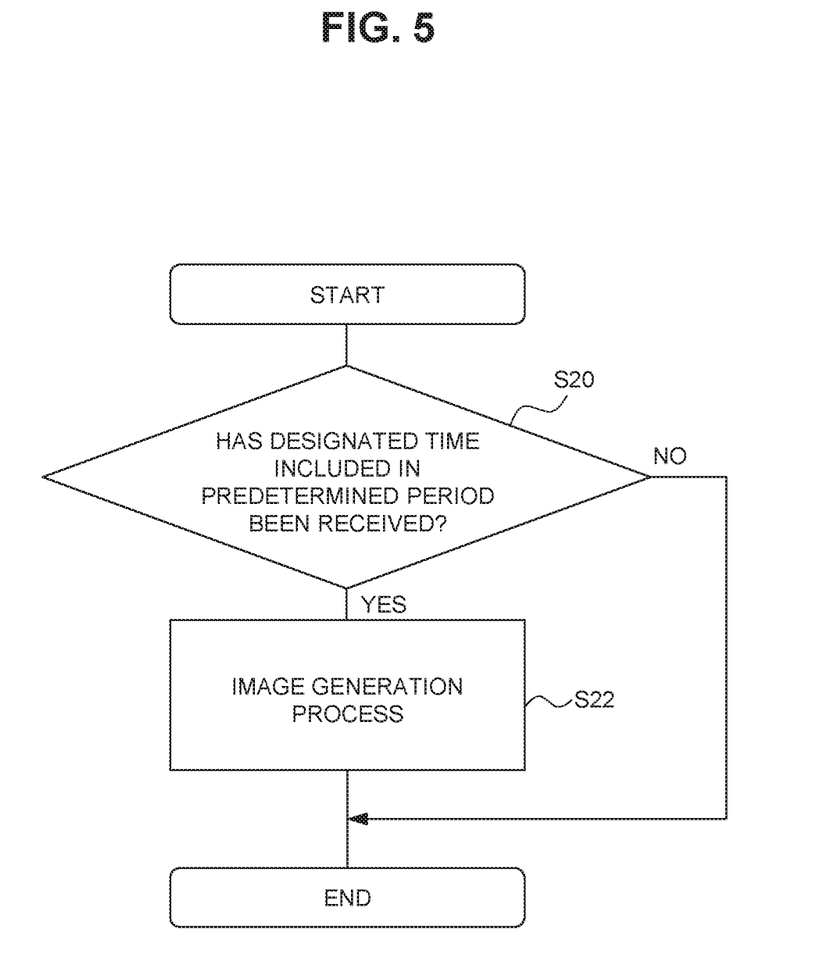
FIG. 5 is a flowchart illustrating an operation of an image generation of the event camera.

Next, an operation of the image generation of the event camera 1 will be described. FIG. 5 is a flowchart illustrating an operation of the image generation of the event camera. The flowchart illustrated in FIG. 5 is started when an image generation function of the event camera 1 is activated. As a specific example, the flowchart illustrated in FIG. 5 is performed when a button for the image generation of the event camera 1 is turned on.

As a receiving process (S20), the receiver 15 of the event camera 1 determines whether the designated time τ included in the predetermined period ΔT has been received. When the receiver 15 determines that the designated time τ included in the predetermined period ΔT has been received, as an image generation process (S22), the generator 16 of the event camera 1 generates an image of the designated time τ. The generator 16 acquires, from the buffer 12, the event signal S01 during the period between the update time tr and the designated time τ. The generator 16 generates the image G02 of the designated time τ by adding the acquired event signal S01 to the image G01 (the image of the update time tr) stored in the storage 14.

When the image generation process (S22) ends or when the receiver 15 determines that the designated time τ included in the predetermined period ΔT has not been received, the flowchart illustrated in FIG. 5 ends. When the flowchart illustrated in FIG. 5 ends and a start condition is satisfied, the event camera 1 repeats the flowchart illustrated in FIG. 5 from the start. The start condition may be, for example, an activation of the image capturing function of the event camera.

Summary of First Embodiment

In the event camera 1 according to the first embodiment, the buffer 12 and the storage 14 store the event signal within the predetermined period ΔT and the image of the time included in the predetermined period ΔT. As such, the event camera 1 can generate an image of any time within the predetermined period ΔT by, for example, outputting the image G01 of the update time tr and the event signal within the predetermined period ΔT. Thus, for example, when an object is a dynamic object, the event camera 1 can select one shot of the movement of the dynamic object, desired by the event camera 1, from among the shots within the predetermined period ΔT. Therefore, the event camera 1 can provide a new function.

According to the first embodiment, the event camera 1 can generate the image G02 of the designated time τ within the predetermined period ΔT. According to the first embodiment, the event camera 1 can generate an image of any time within the predetermined period ΔT by simply adding, to the image G01 of the update time tr, a change in light intensity according to the event signal.

According to the first embodiment, the event camera 1 can generate an image of the same time as the time when the measurement results of the measurement sensor 20 are output. A conventional event camera is not provided with a function for synchronization with another sensor. Above all, since a conventional event camera pursues image responsiveness (a high frame rate when a conventional camera is replaced with a conventional image sensor camera), there is no such idea as intentionally installing a configuration that causes a time delay thereto. However, in order to improve accuracy or reliability of recognition processing, and the like, it is necessary to make a determination by combining detection results of various sensors. Therefore, a timing calibration is required in which detection results of a plurality of sensors having different responsiveness are associated with each other. The timing calibration is also an important technology in the field of autonomous driving. A specific example is a case of a sensor mounted on each of two vehicles moving at a speed of 36 km/h. Assuming that the difference in measurement time between the two sensors is about 0.05 seconds, the difference in the relative position between the objects moving in relative to each other at a speed of 72 km/h (2×36 km/h) is 2 m. When the difference in the relative position between the objects is 2 m, it is not easy to synchronize detection of the sensors with each other. According to the first embodiment, since the event camera 1 can generate an image of the same time as the time when the measurement results of the measurement sensor 20 are output by receiving the measurement time of the measurement sensor 20 as the designated time, the timing calibration can be accurately performed.

Second Embodiment

The event camera 1A according to a second embodiment is partially different from the event camera 1 according to the first embodiment in terms of the functions of an update unit 13A, a storage 14A, and a generator 16A, but the other functions are the same. In the second embodiment, descriptions overlapping with those in the first embodiment are omitted, and differences will be mainly described.

Configuration of Event Camera

Figure 6:
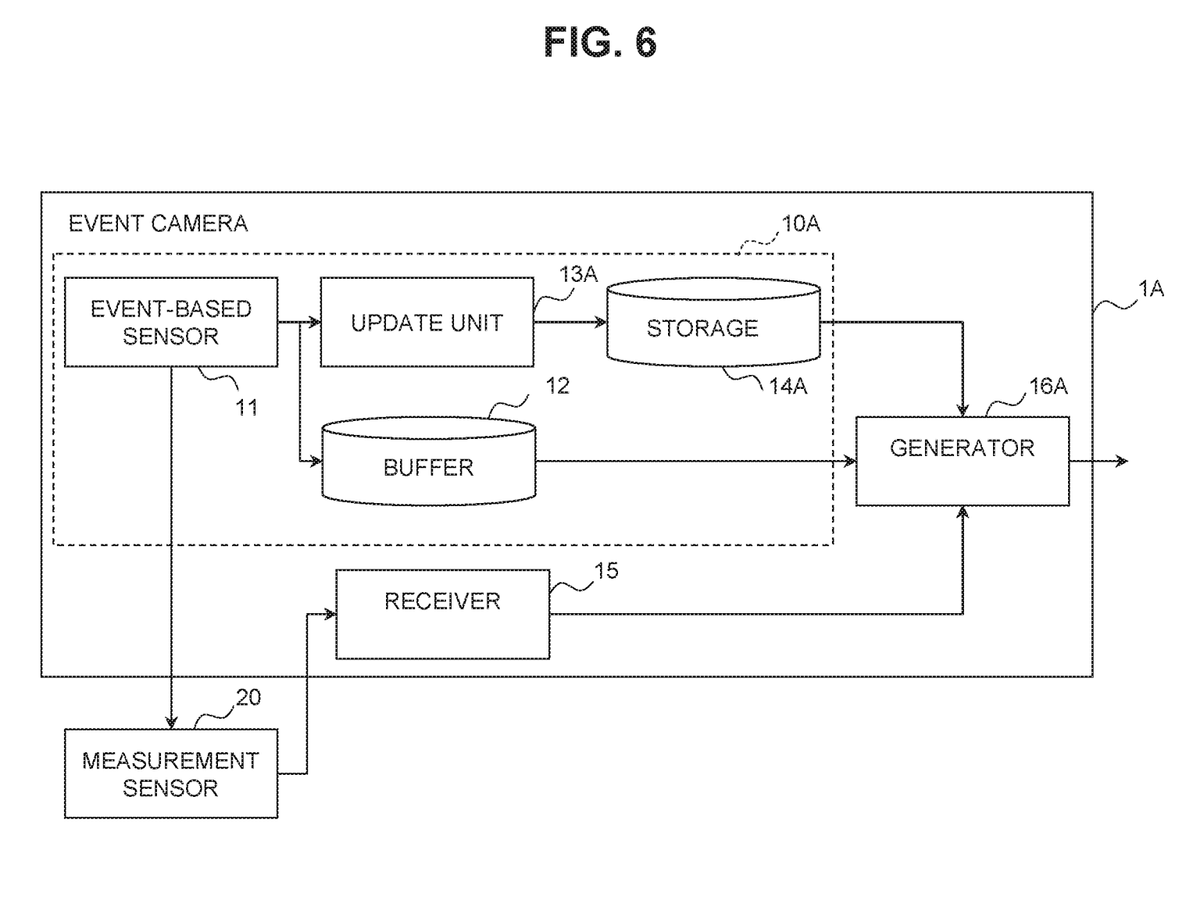
FIG. 6 is a block diagram describing an overview of a configuration of an event camera according to a second embodiment.

FIG. 6 is a block diagram describing an overview of a configuration of an event camera according to the second embodiment. As illustrated in FIG. 6, an event camera 1A includes a sensor unit 10A. The sensor unit 10A is different from the sensor unit 10 according to the first embodiment in terms of some functions of the update unit 13A and the storage 14A, but the other functions are the same.

The update unit 13A updates an image stored in the storage 14A such that the image stored in the storage 14A becomes an image of the update time included in the predetermined period. In the event camera 1A, the update time is the reference time. When the reference time is the current time, the update unit 13A updates the image stored in the storage 14A such that the image is always the latest image. As such, the storage 14A is configured to store an image of the reference time.

Similar to the event camera 1, the event camera 1A can also be configured to generate an image of any time within the predetermined period. In the example of FIG. 6, the event camera 1A includes the receiver 15 and the generator 16A. Each of the receiver 15 and the generator 16A is composed of, for example, a logic circuit. The receiver 15 is the same as that of the first embodiment, and receives a designated time included in the predetermined period.

The generator 16A generates an image of the designated time. The generator 16A generates the image of the designated time based on the image stored in the storage 14A, the event signal stored in the buffer 12, the update time, and the designated time received by the receiver 15. The generated image can be output to the outside of the event camera 1A. Details of the image generation will be described below.

Time Chart of Each Time

Figure 7:
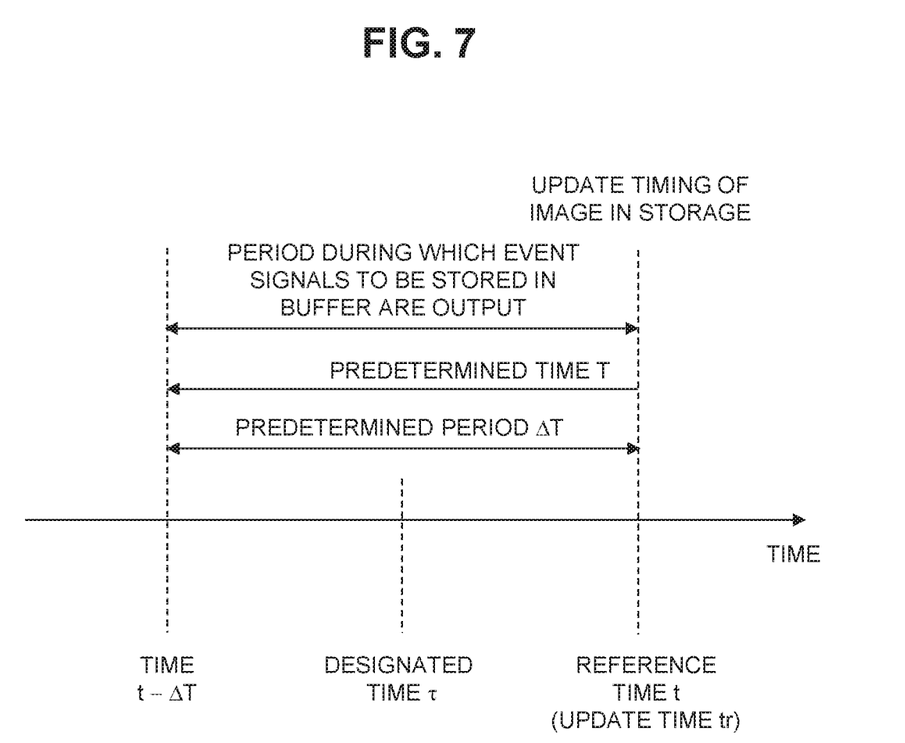
FIG. 7 is a time chart of a storage and the buffer.

FIG. 7 is a time chart of the storage and the buffer. As illustrated in FIG. 7, the time chart is based on the reference time t. The reference time t is the update timing (the update time tr) of the image stored in the storage 14A. As such, the storage 14A stores the image of the reference time t. When the reference time τ is the current time, the storage 14A always stores an image of the current time. The predetermined period ΔT is a period between a time t−ΔT, traced back by the amount of the predetermined time T from the reference time t, and the reference time t. The predetermined period ΔT includes the update time tr and the time t−ΔT. The buffer 12 stores event signals within the predetermined period ΔT. The designated time τ is the time included in the period (the predetermined period ΔT) between the time t−ΔT and the reference time τ.

Details of Image Generation by Generator

Figure 8:
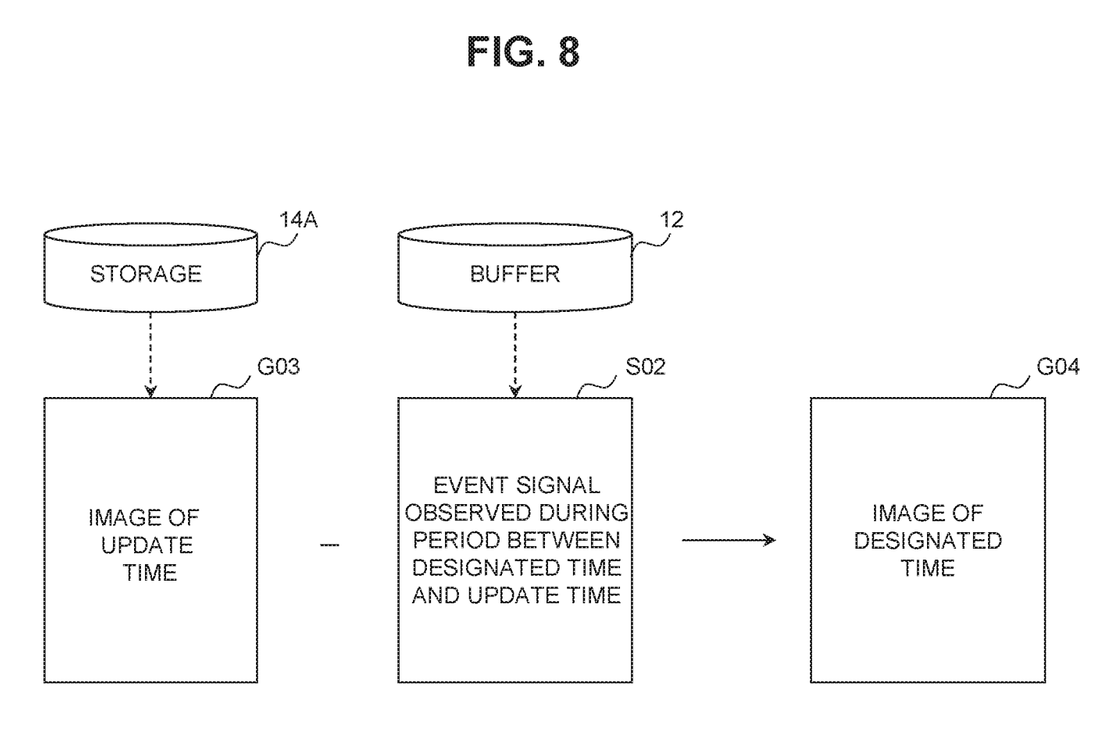
FIG. 8 is a diagram describing the generation of an image of a designated time.

FIG. 8 is a diagram describing generation of an image of a designated time. As illustrated in FIG. 8, an image G04 of the designated time τ is obtained by subtracting, from an image G03 of the update time tr, a change in light intensity according to the event signal S02 observed during a period between the designated time τ and the update time tr. The image G03 is stored in the storage 14A. The event signal S02 is stored in the buffer 12. Since the designated time τ is any time included in the predetermined period ΔT, the generator 16A can generate any image within the predetermined period ΔT.

Operation of Event Camera

The operation of the event camera is different from that of the first embodiment in terms of the operations of the update process (S12) of FIG. 4 and the image generation process (S22) of FIG. 5, but the other operations are the same. In the update process (S12), the only difference between the two embodiments is that the update time tr is changed from the time t−ΔT to the reference time t. In the image generation process (S22), the only difference is that an image is generated by subtracting a change in light intensity according to the event signal, instead of adding the change in light intensity in the second embodiment, as described in FIG. 8.

Summary of Second Embodiment

Similar to the event camera 1 according to the first embodiment, the event camera 1A according to the second embodiment can generate an image of any time within the predetermined period ΔT. As such, for example, when an object is a dynamic object, the event camera 1A can select one shot of the movement of the dynamic object, desired by the event camera 1A, from among the shots within the predetermined period ΔT. Therefore, the event camera 1A can provide a new function.

Similar to the event camera 1 according to the first embodiment, the event camera 1A according to the second embodiment can generate the image G04 of the designated time τ within the predetermined period ΔT. According to the second embodiment, the event camera 1A can generate an image of any time within the predetermined period ΔT by simply subtracting, from the image G03 of the update time tr, a change in light intensity according to the event signal. Similar to the event camera 1 according to the first embodiment, the event camera 1A according to the second embodiment can generate an image of the same time as the time when the measurement results of the measurement sensor 20 are output.

Modified Example

The present disclosure is not limited to the above embodiments. The present disclosure can be variously modified within the scope of the disclosure.

Figure 9:
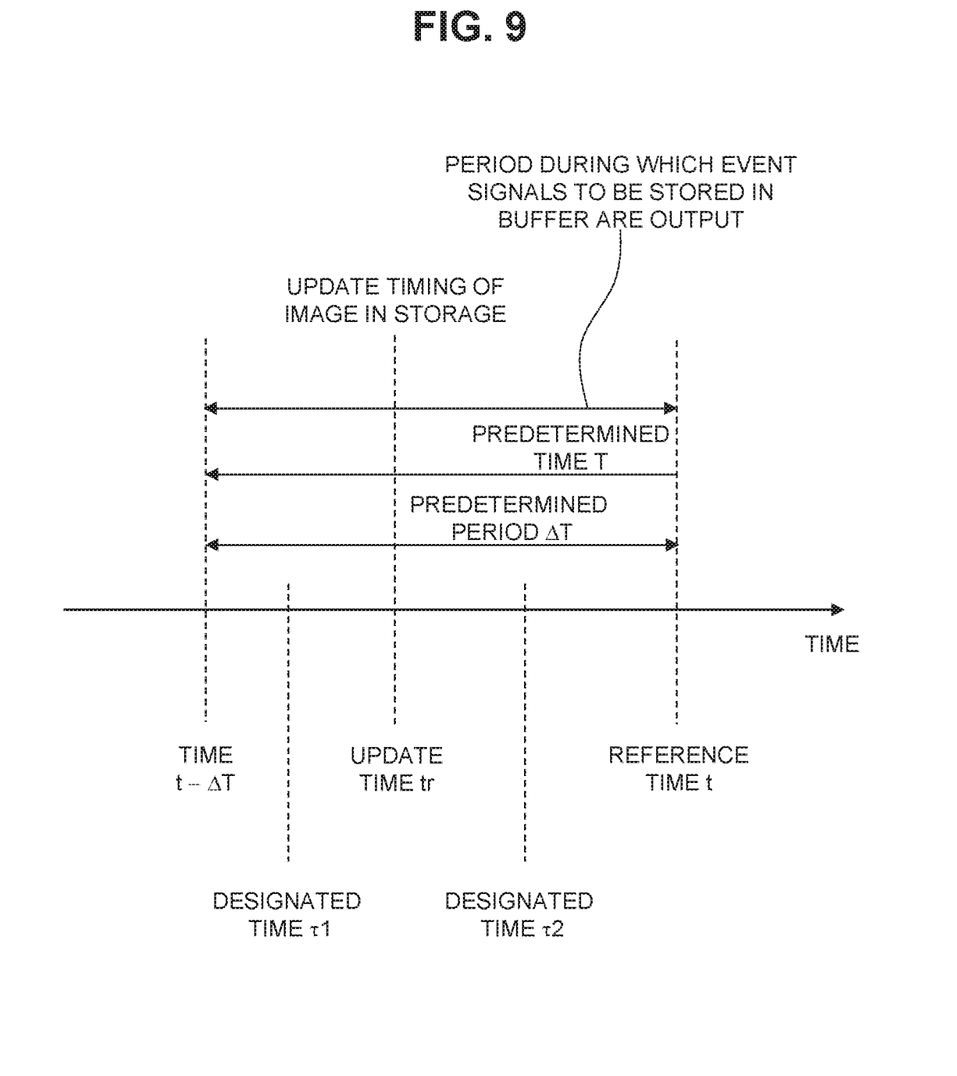
FIG. 9 is another time chart of the storage and the buffer.

For example, the update time tr is not limited to the start time or the end time of the predetermined period ΔT, and may be any time included in the predetermined period ΔT. FIG. 9 is another time chart of the storage and the buffer. As illustrated in FIG. 9, the update time tr may be a time included in the predetermined period ΔT. In this case, when a designated time τ1, which is a time earlier than the update time tr, is received as the designated time τ, the generator 16 generates an image of the designated time τ1 by using the method (the method of subtracting a change in light intensity according to the event signal) described in the second embodiment. When a designated time τ2, which is a time closer to the current time than the update time tr, is received as the designated time τ, the generator 16 generates an image of the designated time τ2 by using the method (the method of adding a change in light intensity according to the event signal) described in the first embodiment. As such, the update time tr may be any time as long as the time is included in the predetermined period ΔT.

The event cameras 1, 1A do not have to include the receiver 15 and the generator 16, and do not have to be connected to the measurement sensor 20.

Components composed of the logic circuit may be implemented by executing a program by an arithmetic device, such as a CPU.

In the above embodiments, although the output of the event camera is described as a light intensity signal, in the event camera according to the above embodiments, the same effect as that of a color event camera can be obtained by adding a color filter appropriate to each pixel and causing the event camera to function as the color event camera.

What is claimed is:

1. An event camera comprising:
    an event-based sensor configured to detect a change in light intensity for each pixel as an event, and asynchronously output an event signal including a time when the event is detected and a pixel position where the event has occurred;
    a buffer configured to store the event signal output by the event-based sensor within a predetermined period between a time, traced back to a past by an amount of a predetermined time from a reference time, and the reference time and;
    a storage configured to store an image; and
    an update unit configured to update the image stored in the storage based on the event signal such that the image stored in the storage becomes an image of an update time included in the predetermined period, the update time is the reference time.

2. The event camera according to claim 1, further comprising:
    a receiver configured to receive a designated time included in the predetermined period; and
    a generator configured to generate the image of the designated time based on the image stored in the storage, the event signal stored in the buffer, the update time, and the designated time received by the receiver.

3. The event camera according to claim 2, wherein the receiver is configured to receive, from another sensor that outputs detection results at a predetermined measurement time, the measurement time as the designated time.

* * * * *